United States Patent [19]

Talbot

[11] 4,432,880

[45] Feb. 21, 1984

[54] PROCESS FOR THE REMOVAL OF HEAVY METALS FROM AQUEOUS SOLUTION

[75] Inventor: Richard S. Talbot, Media, Pa.

[73] Assignee: Richard S. Talbot and Associates, Media, Pa.

[21] Appl. No.: 329,388

[22] Filed: Dec. 10, 1981

[51] Int. Cl.$^3$ .............................................. C02F 1/62
[52] U.S. Cl. .................................. 210/725; 210/727; 210/739; 210/912
[58] Field of Search ............... 210/724, 726, 912, 914, 210/739, 743, 746, 725, 727

[56] References Cited

U.S. PATENT DOCUMENTS

| 3,740,331 | 6/1973 | Anderson et al. | 210/726 |
| 4,278,539 | 7/1981 | Santhanam et al. | 210/724 |
| 4,329,224 | 5/1982 | Kin | 210/724 X |

OTHER PUBLICATIONS

Kim "Treatment of Metal Containing Wastewater by Sulfide Precipitation," presented at AICHE 73rd Annual Meeting, Chicago, Ill., Nov. 16-20, 1980.

*Primary Examiner*—Thomas G. Wyse
*Attorney, Agent, or Firm*—Eugene E. Renz, Jr.

[57] ABSTRACT

A process is described for the removal of one or more heavy metals from an aqueous system containing at least two heavy metals by the addition of a soluble sulfide to precipitate at least one of said heavy metals as the sulfide thereof, which comprises adding an amount of soluble sulfide statistically determined to be sufficient to precipitate as the sulfide substantially all of at least one heavy metal to the limits of its metal sulfide solubility; said statistically determined amount of soluble sulfide being less than the amount required to precipitate as the metal sulfide at least one other heavy metal in said system having a soluble sulfide equilibrium concentration sufficiently higher than that of said selected heavy metal to thus permit selective precipitation of said selected metal and of any other heavy metals present having lower sulfide equilibrium solubility concentrations than that of the selected heavy metal, wtih said precipitation being to the limits of the metal sulfide solubilities; and precipitating at least a portion of at least one heavy metal remaining in said system after said sulfide precipitation by a means other than by sulfide precipitation whereby an aqueous effluent is obtained which contains no sulfide.

21 Claims, No Drawings

PROCESS FOR THE REMOVAL OF HEAVY METALS FROM AQUEOUS SOLUTION

BACKGROUND OF THE INVENTION

It has long been recognized that heavy metals are a very serious environmental pollutant since they are poisonous to many forms of life including man and are frequently introduced to natural waters, including streams, ponds, lakes and the oceans. This is very serious, not only due to the direct contamination of such waters with consequent detrimental or even lethal effect on the life of aquatic organisims which enter into the food chain, but due to the fact that heavy metals tend to build up in such organisims with resulting increased concentration over a period of time. Indeed, the heavy metal concentrations in many types of fish and other sea food has reached a level in some localities such that it is not recommended that these foods by eaten by man. This problem is itself aggravated by the tendency of the heavy metals to build up in concentration in any organism which ingests them, including man. Therefore, human health may be and indeed has been seriously adversely affected not only by drinking water containing heavy metals but by ingesting fish or sea food from such waters or even eating animal or vegetable food raised using such waters.

This problem has become so serious that the U.S. Environmental Protection Agency (EPA) has established very stringent standards for heavy metals in industrial or other waste waters which are discharged to the environment. In particular, EPA regulations have recently been promulgated for regulating the amount of heavy metals discharged by the electroplating industry into waters subject to processing by Publicly Owned Treatment Works (POTW) for subsequent drinking purposes. Similar EPA regulations are expected to be promulgated for as many as 20 other categories of industry.

While a great deal of technology exists concerning the removal of heavy metals from wastewater or other aqueous solutions, the new EPA regulations for the electroplating industry and further regulations to be expected in the future clearly require improved technology to meet the stringent standards for direct discharge of heavy metals into receiving streams or the indirect discharge into the POTW referred to above.

THE PRIOR ART

Existing technology for the removal of heavy metals from aqueous solutions from industrial or other sources generally makes use of either hydroxide or sulfide precipitation of the heavy metals. Conventional hydroxide precipitation has serious limitations since the solubilities of the hydroxides of many heavy metals are too high to meet the stringent standards now in force and others to be expected in the future. Moreover, in hydroxide precipitation systems there is no single pH at which all of the heavy metals can be brought down as is the case with sulfide precipitation systems. While the solubilities of heavy metal sulfides are much lower than those of the corresponding hydroxides, most previously suggested processes have recommended the use of stoichiometric or even excess sulfide which has resulted in the discharge to the environment of hydrogen sulfide, a very poisonous gas with an unpleasant characteristic rotten-egg odor. This problem is especially prevalent in continuous feed systems in which it is difficult to control the process to avoid addition of soluble sulfides in excess of the stoichiometric amount to precipitate all insoluble heavy metal sulfides.

The prior art is replete with patents disclosing the precipitation of heavy metals from aqueous solutions by the use of hydroxides or by the use of excess sulfide. All of these prior processes were subject to various disadvantages which have been recognized in the prior art.

More specifically, Anderson et al. U.S. Pat. No. 3,740,331 issued June 19, 1973, notes that hydroxide precipitation of heavy metal, is not entirely satisfactory, since it is not as complete as precipitation with excess sulfide in other prior art.

Indeed one of the principal objects of the invention of the Anderson et al. patent was to provide a precipitation process more effective than the commercially available hydroxide processes.

Anderson et al. also recognized the disadvantages of precipitating heavy metals with excess sulfide, as in other prior art processes, since the excess sulfide forms hydrogen sulfide gas, the vapors of which are detectable even above highly dilute alkaline solutions.

Anderson et al. proposed to obviate the disadvantages of the prior hydroxide and excess sulfide heavy metal precipitation processes, by using sulfide in excess of that required to precipitate the heavy metal pollutants and scavenging the excess sulfide by the addition of a heavy metal salt having a higher equilibrium sulfide ion concentration than the sulfide of the pollutant heavy metal. The preferred added heavy metal for this purpose is manganese since its sulfide is the most soluble of all heavy metal sulfides. However the cost of manganese sulfide is so high that ferrous sulfide is used as a practical matter. The sulfide precipitant may be sodium sulfide, sodium hydrosulfide or hydrogen sulfide and is used in amounts two to ten times that required to precipitate the heavy metal pollutants initially present, but less than the amount needed to precipitate all of the added heavy metal. Therefore, a small amount of added heavy metal remains in solution, some of which is removed by the hydroxides released by the sulfide replacement reactions.

Santhanam et al. U.S. Pat. No. 4,278,539, issued July 14, 1981, summarizes much of the prior art and points out that existing technology is probably inadequate to meet the present and proposed future standards for heavy metal content of wastewaters. More specifically, Santhanam et al indicate that the heavy metals antimony, cadmium, chromium, copper, lead, mercury, selenium, silver, tin and zinc, represent an extremely serious pollution potential. Of these, Santhanam et al indicate that new technologies may be required for removing at least copper, lead, zinc, cadmium, selenium, arsenic and mercury to met the new and proposed toxicity standards.

Santhanam et al. also teach that the recovery of heavy metals from industrial processes may offer appreciable economic advantages; for example, the recovery of cobalt and nickel from leach liquors, or of copper, lead, and zinc from effluents from smelter operations, or of chromium, selenium, cadmium, and tin from process effluents, or of other sulfides from various hydrometallurgical processes, and, particularly, the recovery of heavy metals from electroplating solutions.

Santhanam et al. list the various available technologies for the recovery of such heavy metals, but indicate that none of these processes is adapted to handle large volumes of aqueous liquids to effectively, reliably and economically remove trace amounts of the heavy metals in a continuous feed process. They teach that this is particularly true of the use of hydrogen sulfide, since the resulting precipitates are very small in particle size, often colloidal in nature, and are thus difficult to separate especially on a continuous basis. The Santhanam et al. process, which is not particularly pertinent to the present invention, involves the controlled sulfide precipitation of heavy metals in such a way as to promote crystal growth and facilitate separation of the precipitates by settling or filtrations.

Blythe et al., in an EPA Project Summary entitled "Characterization of Boliden's Sulfide-Lime Precipitation System" published in August 1981 (EPA-600/S2-81-081) describe a combination sulfide-hydroxide precipitation process for heavy metals in the wastewater from a copper/lead smelting operation in Sweden. The entire disclosure of the Blythe et al. reference and of each of the six references cited therein is hereby incorporated in this specification by reference. Blythe et al. suggested the use of less than the stoichiometric amount of soluble sulfide in bench scale tests. However, in full scale tests, they resorted to the use of an excess of sulfide addition above that required to precipitate all of the heavy metals that could be precipitated as the metal sulfide. Since the amount of sulfide added in their studies was calculated on the total amount of metal present, without regard for the equilibrium metal solubilities as the metal sulfide, rather than on the amount that could be precipitated as the sulfide, they in fact used more than the amount of sulfide necessary to precipitate all the precipitable metals as metal sulfides. Moreover, it is apparent that Blythe et al. failed to teach the art how to control such a process on a large continuous scale since they found it necessary to add excess sulfide while employing pH as the control mechanism.

In view of the foregoing, it is apparent that while the prior art is replete with technology relating to the removal of heavy metals from aqueous solutions, there is a clear and well-recognized need in the art for improved technology to meet the more stringent standards which have been recently imposed and the still more stringent standards to come.

It is an object of the present invention, therefore, to provide an improved process for the removal of heavy metals from an aqueous system whether a solution, suspension, or slurry, which will meet the current and proposed standards.

It is another object of the invention to provide a process for the removal of heavy metals from aqueous solution by sulfide precipitations without the generation of sufficient hydrogen sulfide gas to cause any environmental impact.

It is still another object of the invention to provide a process for the substantially complete removal of all, or selected, heavy metals from aqueous solution which can be conducted on a large scale in continuous flow conventional equipment at low cost.

It is still another object of this invention to provide a method for controlling the addition of sulfides to selectively precipitate metal sulfides.

It is another object of the invention to provide a continuous method for the precipitation of heavy metal sulfides from wastewater in which the wastewater is first analyzed to determine a statistically satisfactory level of soluble sulfide insufficient to precipitate all of the heavy metal content originally present, then after addition of said insufficient amount of soluble sulfide, a sulfide analyzer is optionally used to ensure that no excess sulfide has been or is being added.

SUMMARY OF THE INVENTION

The foregoing and other objects of the invention, which will become apparent below, are achieved by an improved process for the treatment of aqueous solutions containing at least two heavy metals, which provides for the selective removal by sulfide precipitation of substantially all of at least one selected heavy metal and the removal, to the degree desired, of another heavy metal in the solution having a sulfide solubility equilibrium concentration higher than the selected heavy metal, by a different precipitation means, in such a way that hydrogen sulfide is not evolved from the solution in an amount sufficient to significantly pollute the atmosphere.

More specifically, the new process employs two distinct means of precipitating heavy metals, which may be carried out sequentially with the sulfide precipitation first followed by precipitation by other means, or simultaneously.

One of the precipitation operations is initiated by the introduction of a soluble sulfide to the solution to be treated to pecipitate sulfides of at least one heavy metal or a plurality of selected heavy metals initially present, the amount of soluble sulfide employed being insufficient to precipitate all of at least one other heavy metal in the solution. In this way, the sulfide ion concentration in the solution never exceeds the stoichiometric amount required to precipitate all of the heavy metal content originally present in the solution. This being the case, a portion of the excess heavy metal content of the solution is more than sufficient to scavenge any sulfide ion above the amount required to precipitate all of the selected heavy metal. Therefore, no significant amount of unreacted sulfide ion is ever present in the solution to permit the formation of hydrogen sulfide, which is characteristic of the methods of the prior art employing excess soluble sulfide, and substantially no hydrogen sulfide is evolved to significantly pollute the atmosphere.

The heavy metals having sulfide solubility equilibrium concentrations above that of the heavy metal or heavy metals selectively removed by sulfide precipitation, can be removed to the degree necessary or desirable by any other method known to the art for precipitating heavy metals. For example, these remaining heavy metals may be removed wholly or in part by simply raising the pH of the solution to a value which will cause these heavy metals to precipitate as the hydroxides. Such a value will be in the range from about pH 4 to about 12 and preferably about pH 8 to about 10.5. This may be done by any suitable means, whether by the addition of an alkaline material such as lime, soda ash, ammonia, alkali metal or alkaline earth metal hydroxides or otherwise. Indeed, any chemical reaction, other than sulfide precipitation, which will remove the remaining heavy metals may be employed without limitation. The important consideration is that less than enough sulfide be employed to precipitate all of the heavy metal content originally present; the remainder of the heavy metal can be removed to the degree necessary or desired by any other means.

The two different means of precipitating heavy metals may be employed either simultaneously or the sulfide precipitation first followed by precipitation by other means.

The invention also includes a statistical method for controlling the process on a batch or continuous basis for determining the amount of soluble sulfide to be employed in order to precipitate substantially all of a selected heavy metal or metals but to avoid employing an amount of sulfide sufficient to cause the formation and evolution of a significant amount of hydrogen sulfide to the atmosphere.

The control method utilizes statistics to select the dosage of soluble sulfide to apply that will be statistically insufficient to react with all of heavy metals it is desired to precipitate as the metal sulfides. An optional practice of the invention is to use a sulfide analyzer to sense any excess sulfide in the wastewater or atmosphere resulting from the low probability of random over-dosing above a statistically insufficient amount.

DETAILED DESCRIPTION OF THE INVENTION

It is well known to those skilled in the art that the solubility of heavy metal sulfides may be determined experimentally or by calculation.

The equilibrium sulfide ion concentration of some representative heavy metals is set forth in the table below.

| EQUILIBRIUM SULFIDE ION CONCENTRATIONS FOR REPRESENTATIVE HEAVY METALS | |
|---|---|
| Metal Ion | Equilibrium Sulfide Ion Concentration (moles/l.) |
| $Mn^{++}$ | $3.75 \times 10^{-8}$ |
| $Fe^{++}$ | $6.1 \times 10^{-10}$ |
| $Zn^{++}$ | $3.46 \times 10^{-12}$ |
| $Ni^{++}$ | $1.18 \times 10^{-12}$ |
| $Sn^{++}$ | $3.1 \times 10^{-13}$ |
| $Co^{++}$ | $1.73 \times 10^{-13}$ |
| $Pb^{++}$ | $1.84 \times 10^{-14}$ |
| $Cd^{++}$ | $6.0 \times 10^{-15}$ |
| $Ag^{+}$ | $3.4 \times 10^{-17}$ |
| $Bi^{+++}$ | $4.8 \times 10^{-21}$ |
| $Cu^{++}$ | $9.2 \times 10^{-23}$ |
| $Hg^{++}$ | $4.5 \times 10^{-25}$ |

It will be seen that the representative heavy metals in the foregoing table are listed in order of their decending degree of solubility as the metal sulfide; i.e. the most soluble heavy metal sulfide is manganese sulfide at the top and the least soluble heavy metal sulfide is mercury sulfide at the bottom.

It will be apparent to those skilled in the art that, knowing the concentration of any given heavy metal in a solution and the solubility of its sulfide, the stoichiometric amount of soluble sulfide necessary to precipitate all of any given metal in excess of its solubility equilibrium concentration can be calculated.

It has now been discovered that the metals having the lowest sulfide solubility concentration have the greatest affinity for sulfide ion and will be precipitated substantially completely before any metal present in the solution having a significantly higher sulfide solubility equilibrium concentration will begin to precipitate.

Therefore, it is possible to select a given metal in a solution and add sufficient soluble sulfide to precipitate not only that metal but all other metals in the solution having lower sulfide solubility equilibrium concentrations.

For example, suppose a wastewater system contains only $Mn^{++}$, $Fe^{++}$, $Zn^{++}$, $Ni^{++}$, $Pb^{++}$, $Cd^{++}$, and $Hg^{++}$ ions. If it were desired to remove nickel as the nickel sulfide, then sufficient sulfides would have to be added to react with all those heavy metals which have a lower equilibrium sulfide ion concentration than the metal desired to be removed as the sulfide, plus the metal itself. Using the above table of equilibrium sulfide ion levels, sufficient sulfide would have to be added to react with all of the $Hg^{++}$, $Cd^{++}$, $Pb^{++}$, and $Ni^{++}$. In actual practice, it is likely that some excess of this amount would be added to be sure of removing all the nickel. Since there are also present $Zn^{++}$, $Fe^{++}$, and $Mn^{++}$ ions, the excess sulfides would preferentially react with the zinc before the ferrous before the manganese ions. But, in any event, insufficient soluble sulfide would be added to precipitate all of the heavy metals originally present in the wastewater.

This invention uses statistics as an aid in helping to select the amount of soluble sulfide to add to precipitate the desired heavy metals from the water or wastewater as the metal sulfide in continuous flow systems and in batch feed systems. The water or wastewater is characterized as to the concentration of heavy metals present. This is accomplished by analyzing at least one and preferably a minimum of three composite samples of the water or wastewater completely for those heavy metals known or expected to be present therein. Three composite samples is the minimum acceptable from a statistics viewpoint, although as little as one composite could be analyzed, but with a higher degree of risk in the statistical analysis of the data. A determination is made of what heavy metals must be precipitated as the metal sulfide in order to satisfy the standards of a regulatory agency or interested party. Enough sulfide must be provided to precipitate all of the selected heavy metal which can be precipitated as the sulfide and all those heavy metals with lower equilibrium concentrations of soluble sulfide which can be precipitated as the sulfide. To determine this quantity of sulfide, on each of the composite samples so analyzed, a calculation is made of the stoichiometric amount of sulfide required to react with these heavy metals at the desired pH. A statistical analysis of the amount of sulfide required based on an individual composite or the mean of the composites is made. An upper confidence level for an individual composite or for the mean of the composites is established for a certain selected level of confidence using methods of statistics commonly known to those skilled in the art. The confidence level selected might be in the range of 95 to 99.9%, depending on what percent of the time the heavy metals might be allowed to exceed the specifications, but not limited to these percentages. The quantity of sulfide required at this confidence level would be added to the water or wastewater to remove the metals desired to be removed as completely as possible by sulfide precipitation. In fact for further safety in meeting the heavy metal standards, the quantity of sulfide actually added could be some factor larger than the amount calculated from the upper confidence level using statistics.

The maximum amount of soluble sulfide that should be added is also determined using statistics. To determine this quantity of sulfide on each of the composite samples previously analyzed, a calculation is made of the stoichiometric amount of sulfide that can be reacted with all of the heavy metals present at the desired pH to precipitate their metal sulfides. A statistical analysis of the amount of sulfide required based on an individual composite or the mean of the composites is made. A lower confidence level for an individual composite or for the mean of the composites is established for a certain selected level of confidence using methods of statistics commonly known to those skilled in the art. The confidence level selected might be in the range of 95 to 99.9%. The actual amount of sulfide added should be greater than the previously mentioned upper confidence limit but less than the lower confidence limit. In this manner, the sulfide added will be insufficient to react with all the metals present most of the time, and sufficient most of the time to completely react with those metals desired to be removed as the sulfide. Normally the value of the upper confidence limit will be less than the value of the lower confidence limit. However, in the low probability event that the value of the sulfide determined by the lower confidence limit is less than the value determined by the upper confidence limit, the latter value of sulfide would be recommended for dosing.

In any event, the amount of sulfide added should not exceed the amount required to precipitate all the heavy metals or other agents reacting with sulfides originally present in the water or wastewater for any extended period; otherwise, sufficient excess sulfides would exist, with the potential for noxious odor problems. A sulfide analyzer may be employed to detect incipient excess sulfide and to reduce the dosage or eliminate it temporarily to prevent extended periods of such excess.

The invention will now be illustrated more specifically in the following actual examples.

EXAMPLE 1

An aqueous solution containing 15 mg/l $Cu^{++}$ and 100 mg/l $Zn^{++}$ was treated with sufficient sodium hydroxide to raise the pH to about 9.3 which caused the formation of a precipitate of cupric hydroxide. Then 25 mg/l of sulfide was added to the solution which still contained about 3.0 mg/l of dissolved copper. This amount of sulfide had been calculated to be in excess of the stoichiometric amount to precipitate all of the copper in solution but insufficient to precipitate all of the zinc in solution. The sulfide precipitation reduced the copper content of the solution to 0 mg/l. In view of the fact that no copper remained, it is apparent that no copper hydroxide existed, otherwise the solubility would have been 3 mg/l copper in the form of cupric hydroxide, as before. For this reason, all the sulfides added preferentially reacted with the copper, and any excess then reacted with a portion of the zinc.

EXAMPLE 2

Wastewater from a zinc plating operation in an electroplating plant was obtained and analyzed to determine its content of heavy metals. A statistical analysis of the heavy metals content of this wastewater showed that about 6.93 mg/l of soluble sulfide would be required to precipitate all of the $Cu^{++}$, $Cd^{++}$, $Pb^{++}$ and $Ni^{++}$ in the wastewater. The amount of soluble sulfide necessary to precipitate all of the $Zn^{++}$ was calculated to be 27.17 mg/l.

Soluble sulfide, 13.86 mg/l was added to the wastewater. This constituted a 100% excess over the amount required to precipitate all of the $Cu^{++}$, $Cd^{++}$, $Pb^{++}$ and $Ni^{++}$ but still insufficient to precipitate all of the $Zn^{++}$.

The process of the invention was completed by raising the pH to about 9.5. This resulted in lowering the $Pb^{++}$ content to less than 0.2 mg/l and the $Cd^{++}$ content to less than 0.02 mg/l. This compared favorably with the results of a conventional hydroxide precipitation process carried out on this wastewater which also lowered the $Pb^{++}$ content to less than 0.2 mg/l but which left 1.69 mg/l of $Cd^{++}$ in solution.

EXAMPLE 3

An aqueous solution containing 15 mg/l each of $Ni^{++}$, $Pb^{++}$, $Cd^{++}$, and $Cu^{++}$, 2.9 mg/l $Hg^{++}$ and 50 mg/l $Zn^{++}$ was treated in separate experiments with sodium hydroxide to adjust the pH to 8.0 in one case and 9.5 in the other. These two aqueous heavy metal-containing solutions were then treated with 37.1 mg/l of sulfide in aqueous solution. The calculated amount of soluble sulfide to precipitate all of metals except the $Zn^{++}$ was 22.8 mg/l; the stoichiometric amount of sulfide required to precipitate all heavy metals present was 47.3 mg/l. Therefore, the 37.1 mg/l of soluble sulfide added was a 62.7% excess over that required to precipitate the nickel, cadmium, lead, copper and mercury, but insufficient to precipitate all the zinc.

The results of this experiment are set forth in the table below.

| | | HEAVY METAL CONCENTRATIONS IN AQUEOUS SOLUTION BEFORE AND AFTER TREATMENT ACCORDING TO EXPERIMENT 3, IN MG/L | | | |
|---|---|---|---|---|---|
| Heavy Metal | Original Solution | No Sulfide added pH 8.0 | pH 9.5 | Sulfide added pH 8.0 | pH 9.5 |
| $Zn^{++}$ | 50 | 1.2 | 0.25 | 0.57 | 0.04 |
| $Ni^{++}$ | 15 | 3.24 | <0.05 | 1.8 | <0.05 |
| $Pb^{++}$ | 15 | <0.05 | <0.05 | <0.05 | <0.05 |
| $Cd^{++}$ | 15 | 4.8 | 0.24 | <0.05 | <0.05 |
| $Cu^{++}$ | 15 | <0.03 | <0.03 | <0.03 | <0.03 |
| $Hg^{++}$ | 2.9 | 2.9 | 2.6 | <0.001 | <0.001 |

The heavy metal is listed in column 1, with the concentration in the original solution in column 2. The next two columns show the effect of pH adjustment alone, i.e. the precipitation of heavy metal hydroxides as in the prior art. The last two columns show the superior results of the process of the invention in Experiment 3 wherein sulfide precipitation (less than stoichiometric) is used in combination with pH adjustment.

The process of the present invention may be carried out in conventional equipment on a large scale with ease and economy,. For example, the addition of the statistically calculated amount of soluble sulfide may be made in a suitable reactor in batch or continuous flow operation. It is preferred that the reaction vessel be supplied with means to introduce the soluble sulfide below the surface of the water to be treated with sufficient mixing to prevent localized concentrations of soluble sulfide which could exceed the stoichiometric amount and cause formation of hydrogen sulfide.

The pH of the solution is adjusted, if necessary, preferably prior to or simultaneously with the addition of the soluble sulfide to a level high enough to prevent evolution of a significant amount of hydrogen sulfide, generally in the range from about 4 to 12. The pH may require further adjustment after the addition of the soluble sulfide, to the level necessary to further precipitate those heavy metals having a sulfide solubility equilibrium concentration above that of the metal(s) selectively removed by sulfide precipitation.

After pH adjustment, one or more coagulants and/or polymers may be added to assist the coagulation and flocculation of the precipitated metals. The liquid then is passed into a solids separator for solids separation. The solids separator may be a clarifier, with or without plate or tube inserts, a reactor clarifier with internal mixing elements, or a centrifuge type device. A portion (some or all) of the settled sludge may be returned to the reactor to act as seed for enhanced solids separation, or to provide metal sulfide precipitation products that may further release sulfide ions to metals entering the reactor having a lower sulfide equilibrium concentration than some of the metal sulfide forms present in this returned settled sludge. Similarly, in the reactor clarifier, the settled sludge may be allowed to form a sludge blanket through which the treated liquid must flow. This sludge blanket also releases sulfide ions to metals entering the reactor having a lower sulfide equilibrium concentration than some of the metal sulfide forms present in the sludge blanket.

The process of the present invention is easily controlled since the statistically predetermined amount of soluble sulfide is added to the water to be treated either batchwise or in proportion to its volume of flow. In a continuous flow wastewater treatment system, the statistically predetermined amount of soluble sulfide, which is stoichoimetrically insufficient to precipitate all of the heavy metal is added in proportion to the flow of wastewater. Excess sulfide addition is optionally prevented by the use of a sulfide analyzer to sense any excess sulfide present, and send a signal to the dosage control to reduce the amount of sulfide being added. This may be done either by sensing excess sulfide in the wastewater or minimal amounts of hydrogen sulfide which may be detected above the wastewater.

What is claimed is:

1. In a process for the removal of one or more heavy metals from an aqueous system containing at least two heavy metals by the addition of a soluble sulfide to precipitate at least one of said heavy metals as the sulfide thereof, the improvement which comprises:

adding an amount of soluble sulfide statistically determined to be sufficient to precipitate as the sulfide substantially all of at least one heavy metal to the limits of its metal sulfide solubility;

said statistically determined amount of soluble sulfide being less than the amount required to pecipitate as the metal sulfide at least one other heavy metal in said system having a soluble sulfide equilibrium concentration sufficiently higher than that of said selected heavy metal to thus permit selective precipitation of said selected metal and of any other heavy metals present having lower sulfide equilibrium solubility concentrations than that of the selected heavy metal, with said precipitation being to the limits of the metal sulfide solubilities;

and precipitating at least a portion of at least one heavy metal remaining in said system after said sulfide precipitation by a means other than by sulfide precipitation;

whereby an aqueous effluent is obtained which contains no sulfide.

2. The process of claim 1 wherein the soluble sulfide is selected from the group consisting of the alkali metal sulfides, the alkaline earth metal sulfides, the alkali metal bisulfides, hydrogen sulfide, or mixtures thereof.

3. The process of claim 2 wherein the soluble sulfide in sodium sulfide.

4. The process of claim 1 wherein the means for precipitating heavy metal other than by sulfide precipitation is by raising the pH of the solution.

5. The process of claim 4 wherein the pH is raised to a value in the range from about 4 to about 12.

6. The process of claim 5 wherein the pH is raised to a value in the range from about 8 to about 10.5.

7. The process of claim 1, 2, 3, 4, 5 or 6 wherein the pH is raised by the addition of a material selected from the group consisting of lime, soda ash, sodium hydroxide or calcium hydroxide.

8. The process of claim 1, 2, 3, 4, 5 or 6 wherein a flocculant metal hydroxide is formed which aids in separation of the sulfide precipitate.

9. The process of claim 1, 2, 3, 4, 5 or 6 wherein said precipitation of heavy metal sulfide is carried out prior to precipitation of heavy metal by other than sulfide precipitation.

10. The process of claim 1, 2, 3, 4, 5 or 6 wherein said sulfide precipitation and precipitation by other than sulfide precipitation are carried out simultaneously.

11. The process of claim 1, 2, 3, 4, 5 or 6 wherein the precipitated heavy metals are separated from the system with the aid of a coagulant polymer or polyelectrolyte.

12. The process of claim 1, 2, 3, 4, 5 or 6 wherein the precipitated heavy metals are separated by clarification.

13. The process of claim 1, 2, 3, 4, 5 or 6 wherein the precipitated heavy metals are separated by filtration.

14. The process of claim 1, 2, 3, 4, 5 or 6 wherein, due to the introduction of less soluble sulfide than the amount needed to react with all of the heavy metal precipitatable as the sulfide, there is no excess soluble sulfide present, thus precluding the formation of hydrogen sulfide in amounts sufficient to significantly pollute the atmosphere.

15. The process of claim 1, 2, 3, 4, 5 or 6 wherein said sulfide precipitation is carried out after said precipitation by other than sulfide precipitation.

16. The process of claim 1 wherein the probable amount of soluble sulfide to precipitate the selected heavy metal and any other heavy metals having lower sulfide solubility equilibrium concentrations as completely as the metal sulfide solubility relationships allow is determined statistically on a significant number of aqueous samples to be treated, and wherein the amount of soluble sulfide added to the system being treated is greater than or equal to said amount, but below the amount required to precipitate as the sulfide all the heavy metals in said system.

17. A process of claim 16 carried on in a continuous flow system controlled by metering the addition of soluble sulfide in proportion to the flow of the heavy metal-containing aqueous system to provide said amount of soluble sulfide.

18. The process of claim 17 wherein a sulfide sensing device and associated control system are employed as a fail-safe back-up system for intermittently shutting-off the flow of soluble sulfide when said sensor detects trace amounts of sulfide.

19. The process of claim 18 wherein said control system for intermittantly shutting-off the flow of sulfide comprises electronic devices receiving signals from the sulfide sensing device and regulating the operation of the sulfide metering system.

20. The process of claim 18 wherein said back-up sensor detects sulfide in the aqueous solution.

21. The process of claim 18 wherein the back-up sulfide sensor detects hydrogen sulfide in the atmosphere above the aqueous system.

* * * * *